United States Patent

Knutson

[15] 3,646,742
[45] Mar. 7, 1972

[54] CUCUMBER PICKER

[72] Inventor: Lloyd E. Knutson, Route 1, Frederic, Wis. 54837

[22] Filed: Nov. 20, 1970

[21] Appl. No.: 91,463

[52] U.S. Cl. .........................................................56/327 R
[51] Int. Cl. ......................................................A01d 45/00
[58] Field of Search................................56/327 R, 330, 331

[56] References Cited

UNITED STATES PATENTS

| 2,829,484 | 4/1958 | Gilbert | 56/327 R |
| 2,841,947 | 7/1958 | Grew | 56/327 R |
| 2,893,194 | 7/1959 | Lamouria | 56/331 |
| 3,365,869 | 1/1968 | Whiteley | 56/327 R |
| 3,386,236 | 6/1968 | Mitchell | 56/327 R |
| 3,416,298 | 12/1968 | Erdman | 56/327 R |
| 3,427,794 | 2/1969 | Burton | 56/327 R |
| 3,466,859 | 9/1969 | Humphries | 56/327 R |
| 3,457,711 | 7/1969 | Eisenberg | 56/327 R |
| 3,511,038 | 5/1970 | Gates et al. | 56/327 R |
| 3,581,484 | 6/1971 | Gilbert | 56/327 R |

*Primary Examiner*—Russell R. Kinsey
*Attorney*—Clarence A. O'Brien and Harvey B. Jacobson

[57] ABSTRACT

A picker, usually including a pair of picking units, mountable on a tractor through a hydraulically controlled support system whereby a selective raising and lowering of the units can be effected. Each unit includes a supporting framework mounted at one end so as to cantilever laterally in a manner which allows the vines to be raised, moved along and discharged from the individual units without a severing of the vines from the plant. Each unit includes a forward finger mounting pickup roller which raises the vines. The elevated vines are moved rearwardly over a carrier portion in a manner whereby the crop is suspended below the carrier portion and severed from the overlying vines by a cutter bar. The severed produce falls on a conveyor for a lateral discharge thereof while the vines are returned to the ground.

14 Claims, 9 Drawing Figures

PATENTED MAR 7 1972
3,646,742
SHEET 1 OF 4
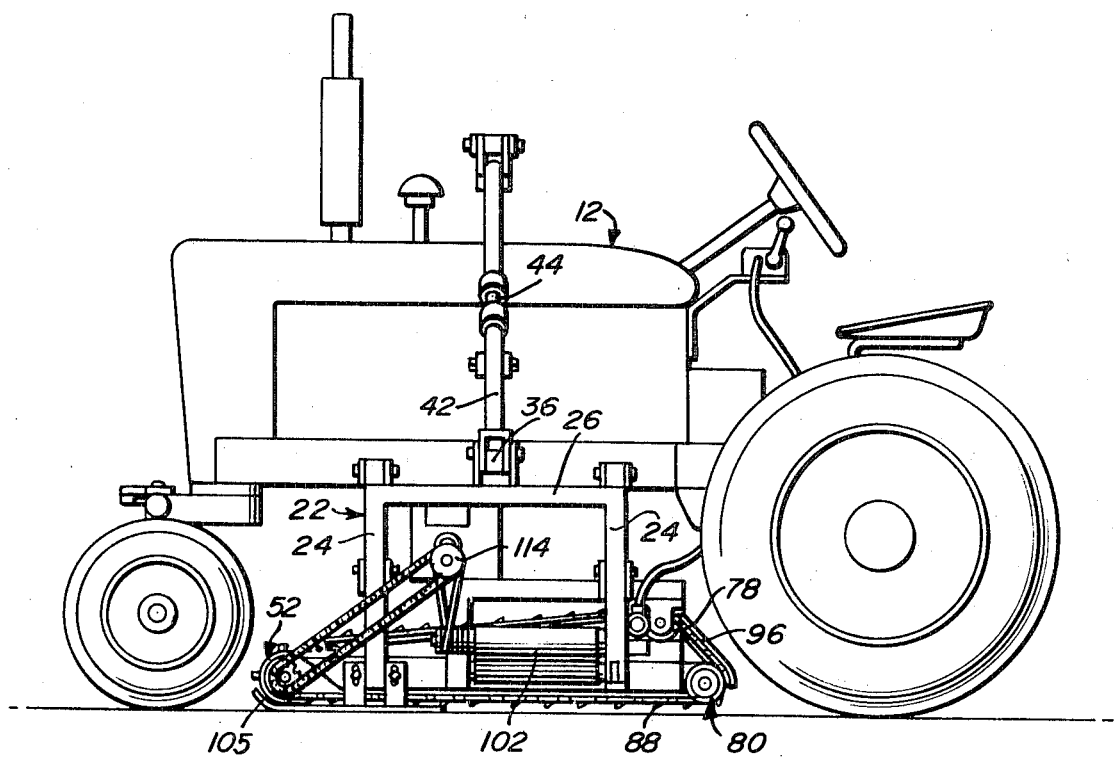
Fig. 1
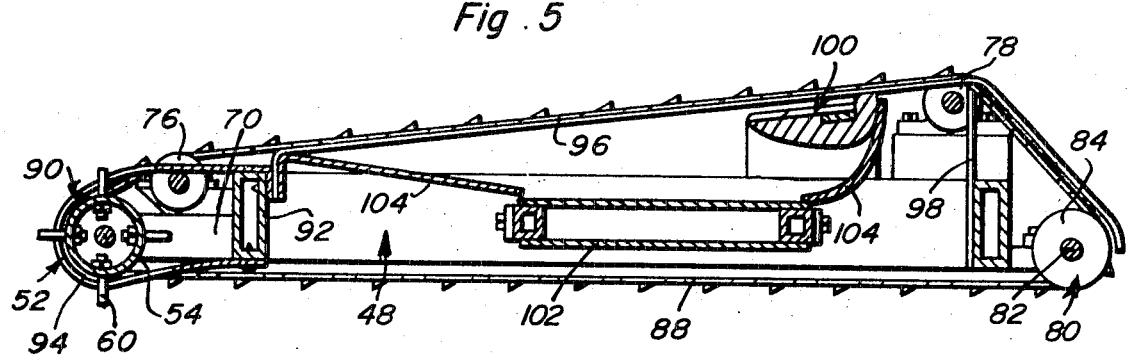
Fig. 5
Fig. 8
Lloyd E. Knutson
INVENTOR.
BY Clarence A. O'Brien
and Harvey B. Jacobson
Attorneys Lloyd E. Knutson
INVENTOR.

BY *Clarence A. O'Brien*
and *Harvey B. Jacobson*
Attorneys

Lloyd E. Knutson
INVENTOR.

CUCUMBER PICKER

The invention herein generally relates to a mechanical harvester or picker for vine growing produce, and is more specifically concerned with a picker for cucumbers, the plants for which have been organized or laid out in a manner whereby the plant runners or vines are alternately directed laterally outward from the row hill whereby half the plant runners will extend to the right and half the plant runners will extend to the left.

The picker moves down the row in a manner whereby a pair of picking units, spaced to the opposite sides of the row, engage beneath, raise and rearwardly move the runners or vines over cutter means which sever the suspended cucumbers from the vines. The rearward travel of the vines continue as the picking units pass thereunder with the vines subsequently being redeposited on the ground. The rearward travel of the vines on the picking units is coordinated to the forward travel of the apparatus so as to return the vines to approximately their original position, thereby avoiding any pulling or tearing thereof such as might be detrimental to the plants. The picking units are cantilevered from the outer ends whereby no interfering portions are provided to the movement of the vines thereover with the vines, as they are being elevated, being shifted slightly inward toward the planting row so as to compensate for the elevating of the vines. The picking units are tractor mounted by an adjustable suspension system which allows for a raising and lowering of the picking units as well as a slight ground following floating action. The initial raising of the vines is effected by a pickup roller incorporating projecting pickup fingers which engage beneath, elevate and rearwardly direct the vines to belts which continue the rearward movement of the vines over the cutter bar. Guard means is provided about the front roller so as to avoid an entangling of the vines therewith, the guard means incorporating slots for the accommodation of the pickup fingers with the guard means being so orientated as to provide for a relative retraction of the fingers at the upper point at which the vines are discharged to the rearwardly moving belts.

The machine constructed in this manner incorporates significant advantages including the ability to harvest cucumbers repeatedly throughout the growing season without damage to the vines or blossoms, in conjunction with the ability to harvest cucumbers of any desired size, such being determined by the frequency of picking.

Other significant objects of the instant invention include an adaptability for mounting on farm tractors of various types, simplified control means for vertically adjusting the picking units, and the provision of vine handling and crop severing means which avoids damage to both the crop and the plant.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevational view of the apparatus of the instant invention mounted on a tractor;

FIG. 5 is an enlarged longitudinal cross-sectional view taken through a picking unit;

FIG. 8 is another view of the crop arrangement; and

Figure 2:
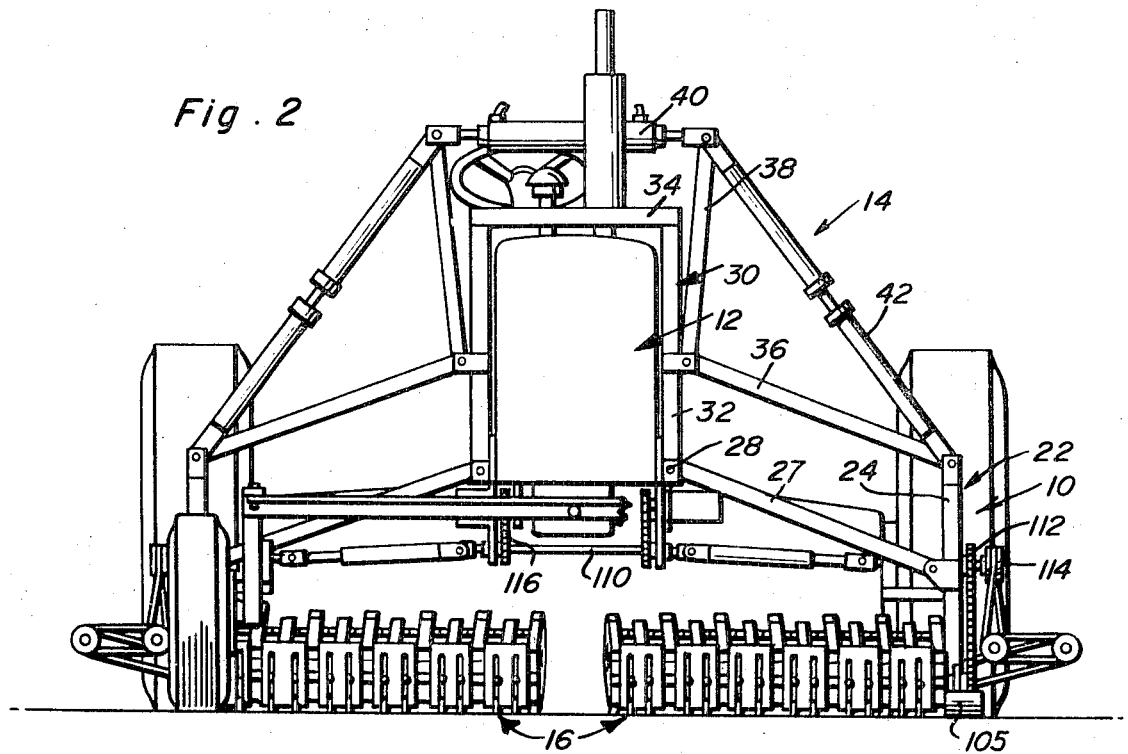
FIG. 2 is a front elevational view of the tractor mounted apparatus.
Figure 6:
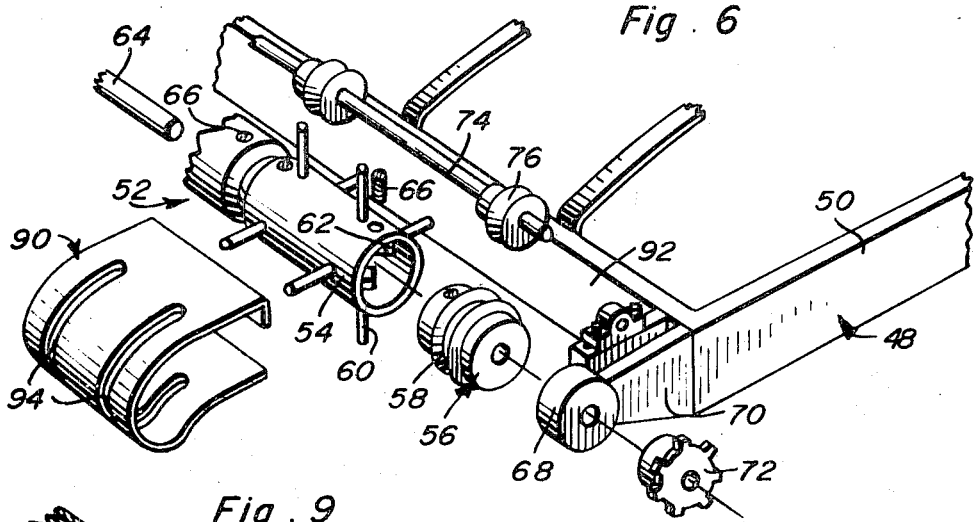
FIG. 6 is an exploded perspective view of the forward pickup end of a pickup unit.

Referring now more specifically to the drawings, reference numeral 10 is used to designate the picker or picking apparatus comprising the instant invention. This apparatus 10 is mountable on a conventional farm tractor or like self-propelled vehicle 12 through a unique suspension system 14. The apparatus, in addition to the suspension system, includes a pair of picking units 16 which are independently mounted and synchronized in operation so as to move along the oppositely directed runners or vines 18 trained outwardly from a central planting row hill 20 along which the tractor 12 travels.

The suspension system 14 includes, to each side of the tractor body between the front and rear wheels thereof, an outwardly spaced vertical frame 22 consisting of two spaced uprights 24 interconnected at the upper ends thereof by a crossbeam 26. A pair of lower links or arms 27 are pivotally engaged with each pair of frame uprights 24 at approximately midheight thereon, and extend from these uprights 24 to pivotal engagement with the tractor body, as at 28. If deemed desirable for stability, a cross beam can also interconnect the arms or links 27.

A frame 30, bolted or otherwise affixed to the body of the tractor 12, is positioned between the inner ends of the two pairs of arms 27 and includes an upright 32 vertically along each side of the tractor body and a crossbeam 34 overlying the body and interconnecting the upper ends of the uprights 32. An intermediate link or arm 36 is pivoted at approximately midheight to each upright 30 and extends outward therefrom, between, above and parallel to the associated arms 27, to pivotal engagement with the crossbeam 26 of the associated outer frame 22. A vertical arm or link 38 is provided in conjunction with each frame upright 32 and has the lower end thereof pivoted to the upright at the point of pivotal mounting of the intermediate arm 36. The upper end of each of the arms 38 is engaged by one end of a double acting hydraulic cylinder and piston unit 40 whereby a synchronized outward and inward swinging of the arms 38 can be effected through an operation of the hydraulic unit 40. The upper end of each of these vertical arms or links 38 is connected to the associated frame 22 by means of an elongated upper arm or link 42 having one end pivoted to the upper end of the associated arm 38 and the other end pivoted to the cross beam 26 of the associated frame 22 at the point of pivotal mounting of the intermediate arm 36. In this manner, as the arms 38 are swung inwardly or outwardly, there will be a corresponding raising and lowering of the outer frames 22, this raising and lowering of the frames 22 being done in a manner whereby the frames are retained vertically orientated due to the parallel linkages 27 and 36.

Figure 9:
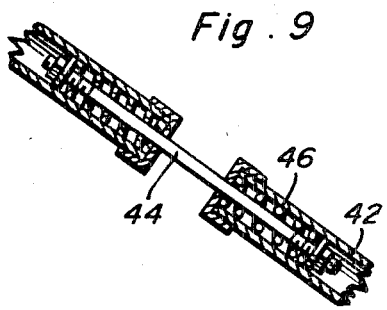
FIG. 9 is an enlarged cross-sectional detail through the spring-loaded upper support arms.
Figure 3:
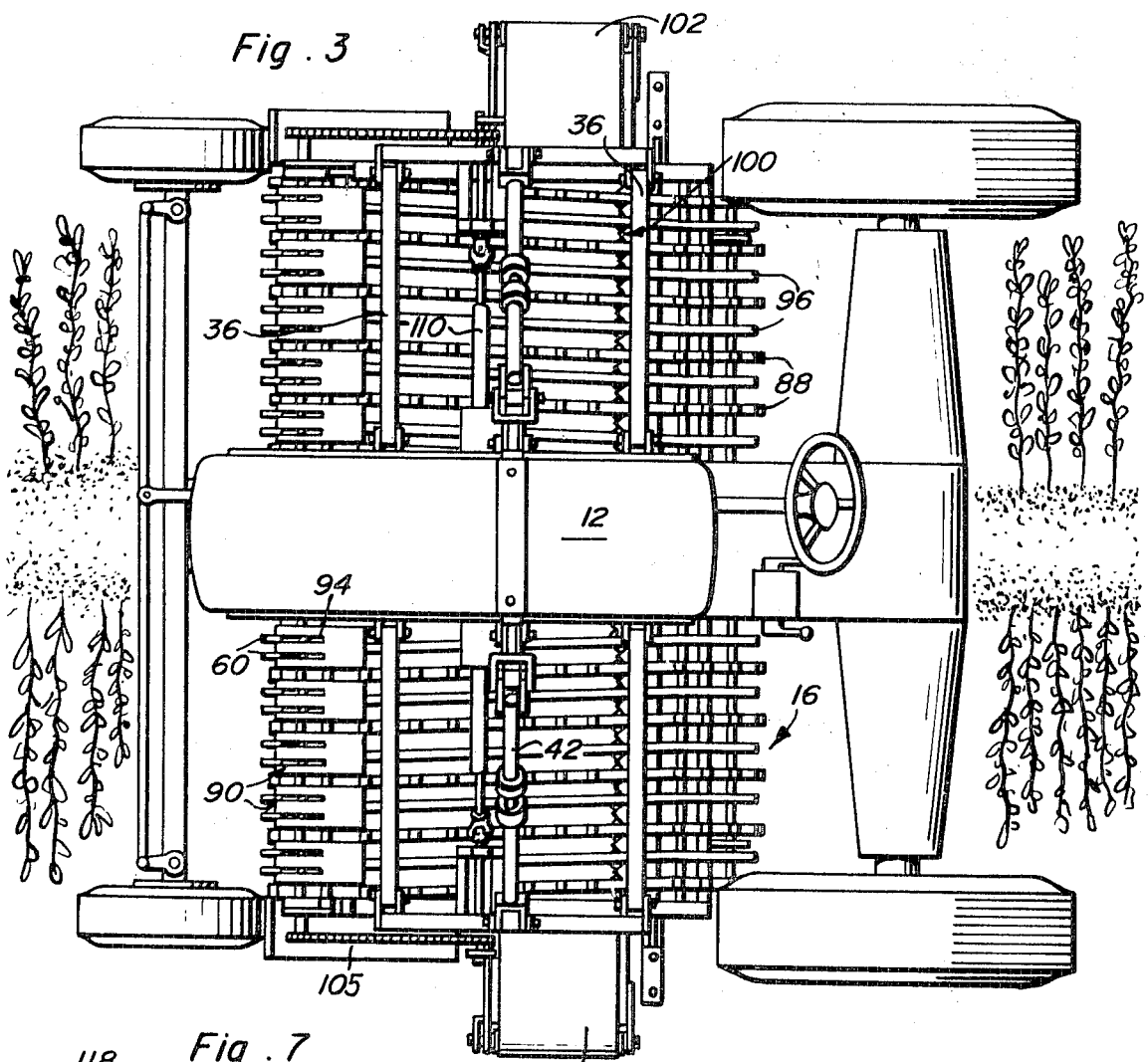
FIG. 3 is a top plan view illustrating both the tractor mounted apparatus and the general crop arrangement.
Figure 7:
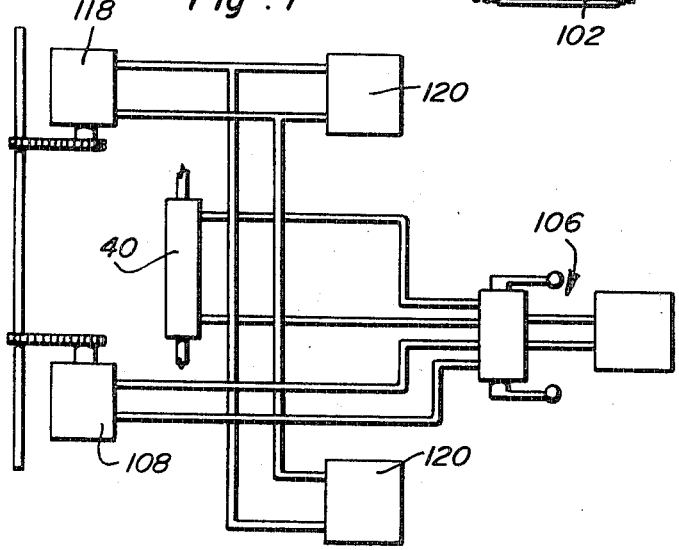
FIG. 7 is a schematic view of the hydraulic system utilized.
Figure 4:
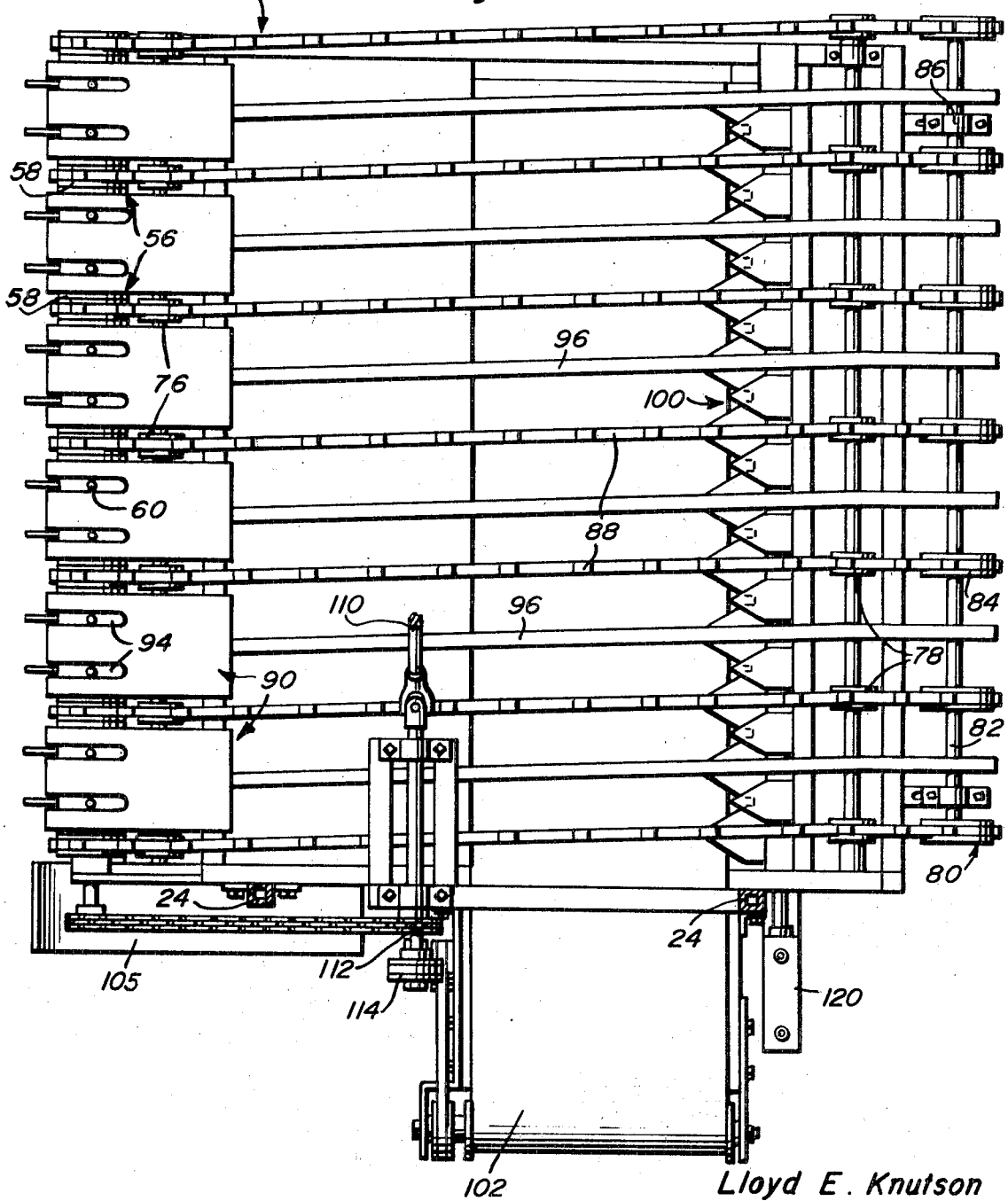
FIG. 4 is an enlarged plan view of one of the picking units.

In order to accommodate slight variations in ground level and provide for a small degree of floating action without requiring constant adjustments of the hydraulic unit 44 for such variations the upper arms 42 are spring-loaded, as generally detailed in FIG. 9. This is effected basically by forming each arm or link 42 in two sections between which an elongated rod 44 extends, the opposite ends of the rod 44 cooperating with each capped end of the corresponding link section so as to retain a compression spring 46 therebetween. The slight movement provided for by the spring-loading of the upper arms 42 is accommodated by the provision of a short slot in the outer end of each intermediate link 36 through which the pivot pin is received, the associated frame 22 thus pivoting to a small degree about the pivotally connected lower arms 26.

Each of the vertical side frames 22 mounts one of the picking units 16 for a suspension thereof from the tractor and a vertical adjustment thereof with the side frame. Each of the picking units 16 includes a generally rectangular or open support frame 48 having the outer side or side beam 50 rigidly affixed to the lower end of an associated vertical frame 22 in a manner whereby the frame 48 cantilevers freely inward therefrom leaving an inner unsupported side edge over which the vines can freely move as shall be explained subsequently. The picking units, aside from having the components thereof reversed so as to enable a synchronized operation along both sides of the row 20, duplicate each other in structure and operation. Accordingly, the following description, while directed to a single picking unit 16, applies equally to both of the units.

An elongated pickup roller 52 is mounted transversely across the front of the frame 48 and consists of a series of short tubular sections 54 interconnected by end caps 56, each provided with a central integral pulley 58. Two sets of picking fingers 60 are provided on each tube or tubular section 54, these fingers being arranged peripherally about the tube and including threaded inner ends for removable mounting within internally threaded nuts 62 welded about the inner surface of the tube 54 so as to enable a replacement of the picking fingers 60 as required.

The internested tubes 54 and end caps 56 are in turn mounted on an elongated central shaft 64 and locked thereto by appropriate setscrews 66 which extend through the end portions of each tube 54, the telescopically received portions of the end cap 56, and into locked engagement with the shaft 64 for a rotation of the entire roller construction upon a driving of the shaft 64. The opposite ends of the shaft 64 are received within appropriate bearing units 68 mounted on a pair of forwardly projecting ears 70 at the opposite sides of the support frame 48. The end of the shaft 64 corresponding with the outer side of the tractor 12 has a gear 72 fixed thereon through which power is received for a driving of the pickup roller 52. When driven, the roller rotates forwardly upwardly and rearwardly so as to raise and rearwardly discharge the encountered vines 18. With reference to FIG. 5 in particular, it will be noted that the pickup roller 52 is so orientated as to project slightly below the support frame 48 with the pickup fingers 60 rotating substantially below the frame 48 for a positive engagement beneath the encountered vines.

Located immediately rearward of the roller 52 is a second mounted shaft 74 which mounts a series of idler pulleys 76, one aligned with each of the roller pulleys 58.

A third series of shaft mounted freely rotating pulleys 78 is provided across the rear of the support frame 48 corresponding in number to the pulleys 58 and 76 and both elevated and inwardly offset relative thereto for reasons which shall be explained presently. Finally, a rear roller assembly 80, consisting of a central shaft 82 and a series of pulleys 84 thereon in alignment with the pulleys 78, is provided. The rear roller assembly 80 is mounted at approximately the same height, relative to the frame 48, as the front roller assembly 52 and includes mounting brackets 86 which are longitudinally adjustable so as to enable an adjustment of the tension within the carrier belts 88 which engage with the above-described aligned pulleys.

The belts 88 are in the nature of elongated endless V-belts notched or ribbed about the outer surface thereof so as to provide vine gripping and moving means. Each belt 88 travels upwardly about a front roller pulley 58, upwardly and rearwardly therefrom over an aligned idler pulley 76 and, from the idler pulley 76, rearwardly and upwardly at an inclination over the mounting frame 48 to the associated rear pulley 78 shifted slightly inward relative to the forward pulley 76. In this manner, each belt 88, as it travels rearwardly over the support frame 48, moves upwardly and inwardly along an inclined path. This slight inward directing of each of the belts 88 is significant in that the vines 18, raised and moved rearwardly by the belts relative to the forward moving frame 48 are progressively shifted inward toward the centrally located planting hill 20 as the vines are elevated so as to avoid any excess pulling on the vines such as might damage the plant or strip the vines therefrom. The belts 88, after passing over the upper rear pulleys 78, angle downwardly and move about the rear roller pulleys 84 for a return run to the front roller 52. The downward movement of the belts 88 from the pulleys 78 to the pulleys 84 returns the vines to the ground. In actual operation, it is contemplated that the speed of the rearwardly moving belts 88 be adjusted relative to the forward speed of the tractor 12 whereby the vines will be raised, moved rearwardly over the picking unit 16, and redeposited on the ground in substantially the original location. Further, inasmuch as the inner end of the picking unit 16 is freely supported, due to the cantilevered nature of the support frame 48, the vines can freely pass thereover without encountering any obstructions or blockage such as might tend to sever the vines.

A series of front roller guards 90 are provided about the front roller 52, one associated with each roller tube or tube section 54. Each of the guards 90 is in the nature of a flat plate arcuately curved so as to overlie the forward portion of the corresponding tube 54 with the upper and lower edges of the guard 90 fixed to the upper and lower edges of the front beam 92 of the support frame 48. The opposite end portions of the guard 90 are generally parallel so as to project horizontally rearward from the front roller 52 to the front frame beam 92. The guards 90, individually associated with the tube 54, are spaced slightly from each other so as to accommodate the belts 88 and the roller pulleys 58 and associated idler pulleys 76 therebetween. In addition, in order to accommodate the picking fingers 60, each of the guards has a pair of elongated slots 94 therein. With reference to FIG. 5 in particular, it will be appreciated that the slotted guards 90 are so orientated as to provide for a maximum projection of the picking fingers 60 through the slots 94 along the bottom and forward portion of the guard 90 with the fingers 60 progressively retracting relative to the overlying guard as the fingers move upwardly and rearwardly toward the belt overlying support frame. The relative retraction of the picking fingers 60 in this manner avoids any entanglement with the vines and provides for an effective depositing of the vines on the rearwardly traveling belts 88. By the same token, the roller guards 90 and the elevated pulleys 76 immediately to the rear of the front roller 52 eliminate any tendency for the vines to entangle about the front roller both through a covering of the front roller and through an elevating of the belts 88 which in turn results in an elevation of the vines away from the front roller.

A plurality of front-to-rear extending carrier bars 96 alternate with the carrier belts 88 and extend from the front frame beam 92 upwardly and rearwardly over the upper rear shaft which supports the pulleys 78, supported by an appropriate upright plate or the like 98, and then downwardly, following the angle of the belts 88, to a free discharge end overlying the rear roller assembly 80. These carrier bars 96 assist in retaining the carried vines above the actual crop harvesting portion of the unit 16, which shall be described presently. Further, the rearwardly overhanging portions of the bars 96 allow for a dropping of the vines off the back of the unit 16 without danger of the rear roller assembly 80 carrying the vines or plants thereunder, the vines being specifically held away from the rear roller assembly. Finally, the carrier bars assist in supporting the transversely orientated cutter or sickle bar assembly 100.

The cutter assembly 100 underlies the carrier belts 88 and bars 96 immediately forward of the rear shaft mounted pulleys 78 for an effective severing of the produce from the carried vines. In practice, while the vines will be supported above and carried by the belts 88 and bars 96, the spacing between the belts and bars is such so as to allow for a free falling or suspension of the cucumbers or the like therethrough into a depending orientation with the cutter assembly 100, spaced closely beneath the belts and bars, severing the stems and allowing for a downward dropping of the cucumbers. The spacing of the belts and bars is such so as to enable a harvesting of the crop of any stage of their growth whereby the size of the produce obtained can be varied as desired. A driven endless conveyor belt 102 underlies the cutter means 100 for the reception of the severed produce, appropriate produce directing plate means 104 being provided along opposite sides of the conveyor belt 102 so as to assist in directing the produce thereto. The conveyor belt 102 will in turn discharge the produce laterally outward of the picking unit for collection in any appropriate manner.

A skid or guide shoe 105 is secured to the outer side of the mounting frame 48 and projects forwardly therefrom, terminating in an arcuate upturned forward end for a guiding movement along the ground, sensing minor contour variations so as to provide for a following of these variations due to the floating nature of the picking unit 16 as previously described.

The drive means for the two synchronized picking units 16 utilizes the hydraulic system, generally designated by reference numeral 106, of the tractor 12. A hydraulic motor 108 chain drives an elongated movement accommodating shaft 110, incorporating both telescopic and universal joints. The shaft 110, at the opposite ends thereof, mounts appropriate gears and pulleys 112 and 114 for a chain driving of the two front rollers 52 and a belt driving of the two conveyors 102. The shaft 110, through chain 116, also drives a cam-operated hydraulic control unit 118 which activates hydraulic units 120 which drive the two cutting bar units.

From the foregoing, it will be appreciated that a highly unique cucumber picker has been defined wherein a pair of picker units simultaneously operate so as to pick cucumbers from the oppositely directed vines of a crop row. The vines are gently elevated and move rearwardly relative to the forwardly moving machine. The produce depends from the elevated vines and is severed therefrom by cutter means with the vines moving rearwardly of the cutter means and being redeposited on the ground without damage to either the vines or the plants. The spacing between the carrier bars and carrier belts is such so as to enable a harvesting of crops of all sizes with the particular size harvested being determined by the frequency of picking.

Although the picker has been illustrated and described as incorporating a specific suspension system which mounts the apparatus on the body of a tractor, preferably a tractor wherein the spacing between the wheels can be adjusted so as to accommodate crop rows of varying widths, the particular picker units can, if so desired, be adapted for support by an appropriate three-point hitch, or can be mounted on a small self-propelled chassis.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A picker for cucumber and like vine growing produce, said picker comprising a support frame, a front pickup roller mounted on said frame, means rotatably driving said pickup roller forwardly, upwardly and rearwardly for a raising and rearward directing of produce bearing vines upon a forward movement of the picker, laterally spaced carrier means extending rearwardly from said roller, said carrier means, rearward of the roller, being elevated relative to the ground for a support of the vines with the produce depending therefrom between and below said spaced carrier means, and cutter means positioned transversely across said frame rearward of the roller and in underlying relation to said carrier means for a severing of produce from the vines, said carrier means extending rearwardly of the cutter means and downwardly toward the ground for a redepositing of the vines.

2. The picker of claim 1 including outwardly projecting picking fingers on said pickup roller and guard means overlying said roller, said guard means including elongated slots therein for the accommodation of said fingers therethrough, said guard means being orientated relative to the roller and fingers whereby the fingers project a maximum distance beyond the guard means below and forward of the roller and gradually retract, upon a rotation of said roller, relative to the guard means as the fingers move upwardly and rearwardly.

3. The picker of claim 2 wherein said carrier means comprises alternating movable belts and fixed bars.

4. The picker of claim 3 including a suspension system for suspending said support frame from a mobile vehicle, said suspension system engaging said support frame at one end thereof, said frame cantilevering from the suspension system so as to expose the second end thereof for unencumbered movement of the vines thereover.

5. The picker of claim 4 including a produce collecting and moving conveyor underlying said carrier means adjacent said cutter means for a reception of the severed produce.

6. The picker of claim 5 wherein each of said carrier belts is endless and engages about the pickup roller and an idler pulley in alignment therewith above and behind the roller.

7. The picker of claim 6 including a shaft mounted pulley associated with each belt rearward of the first mentioned pulley and laterally offset toward the unsupported end of the support frame for a gradual lateral shifting of the vines in conjunction with an elevation of the vines, said belts inclining upward between the first mentioned and second mentioned pulleys.

8. The picker of claim 7 wherein said suspension system includes means for vertically adjusting said support frame while maintaining a generally horizontal orientation thereof.

9. The picker of claim 7 wherein said pickup roller comprises a plurality of separate tubular sections releasably interconnected by end caps, each of said end caps defining a pulley for the reception of a carrier belt thereabout, said pickup fingers being releasably secured to said tubular sections.

10. The picker of claim 1 wherein said carrier means comprises alternating movable belts and fixed bars.

11. The picker of claim 1 including a suspension system for suspending said support frame from a mobile vehicle, said suspension system engaging said support frame at one end thereof, said frame cantilevering from the suspension system so as to expose the second end thereof for unencumbered movement of the vines thereover.

12. A picker for cucumbers and the like comprising a suspension system, a pair of laterally spaced picking units mounted on said suspension system, each picking unit including an outer end and an inner end, said inner ends being in spaced facing relation to each other, each picking unit being affixed to the suspension system solely at the outer end thereof whereby each picking unit cantilevers inwardly from the outer end thereof and is provided with a free inner end, said picker being movable along a row crop with the picking units to the opposite sides thereof for a gathering of laterally directed plant runners and a harvesting of the produce therefrom, each picking unit including means for raising and rearwardly directing crop vines with the vines moving freely over the suspended inner end of each picking unit, and cutter means on each picking unit for a severing of the produce from the vines.

13. The picker of claim 12 wherein each picking unit comprises a support frame, a front pickup roller mounted on said frame, means for rotatably driving said pickup roller forwardly, upwardly and rearwardly for a raising and rearwardly directing of the produce bearing vines upon a forward movement of the picker, and laterally spaced carrier means extending rearwardly from said pickup roller, said carrier means being elevated relative to the ground for a support of the vines with the produce depending therefrom, between and below said spaced carrier means.

14. The picker of claim 13 including outwardly projecting picking fingers on said pickup roller and guard means overlying said roller, said guard means including elongated slots therein for the accommodation of said fingers therethrough, said guard means being orientated relative to the roller and fingers whereby the fingers project a maximum distance beyond the guard means below and forward of the roller and gradually retract, upon a rotation of said roller, relative to the guard means as the fingers move upwardly and rearwardly.

* * * * *